United States Patent
Park

(10) Patent No.: US 10,955,008 B1
(45) Date of Patent: Mar. 23, 2021

(54) CONE CLUTCH FOR VEHICLE

(71) Applicants: Hyundai Motor Company, Seoul (KR); Kia Motors Corporation, Seoul (KR)

(72) Inventor: Jong Yun Park, Hwaseong-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/787,530

(22) Filed: Feb. 11, 2020

(30) Foreign Application Priority Data

Sep. 16, 2019 (KR) .......................... 10-2019-0113283

(51) Int. Cl.
*F16D 13/32* (2006.01)
*F16D 13/74* (2006.01)

(52) U.S. Cl.
CPC ............. *F16D 13/32* (2013.01); *F16D 13/74* (2013.01)

(58) Field of Classification Search
CPC .......... F16D 13/32; F16D 13/24; F16D 13/74; F16D 23/025
See application file for complete search history.

(56) References Cited

U.S. PATENT DOCUMENTS

| 1,924,875 A | * | 8/1933 | Murray | F16D 23/025 192/53.36 |
| 2005/0120818 A1 | * | 6/2005 | Matsufuji | F16H 61/702 74/339 |
| 2010/0012452 A1 | * | 1/2010 | Karais | F16D 23/04 192/53.32 |
| 2015/0211585 A1 | * | 7/2015 | Fernandez | F16H 63/30 74/339 |
| 2018/0142739 A1 | * | 5/2018 | Park | F16D 23/04 |

FOREIGN PATENT DOCUMENTS

KR 10-2018-0058907 A 6/2018

* cited by examiner

*Primary Examiner* — Huan Le
(74) *Attorney, Agent, or Firm* — Morgan, Lewis & Bockius LLP

(57) ABSTRACT

A cone clutch for a vehicle including a hub, a sleeve, and a clutch ring including a clutch cone, may further include a first friction ring for forming frictional force with the clutch cone, an internal middle cone, a second friction ring, an external middle cone, and a third friction ring, which are sequentially mounted to be brought into contact with each other. When the third friction ring is pressed by the sleeve and the third friction ring, the external middle cone, the second friction ring, the internal middle cone, the first friction ring, and the clutch cone are sequentially brought into close contact with each other, the distances from the hub in an axial direction gradually increase in the order of the first friction ring, the internal middle cone, the second friction ring, the external middle cone, and the third friction ring.

5 Claims, 5 Drawing Sheets

CONE CLUTCH FOR VEHICLE

CROSS-REFERENCE TO RELATED APPLICATION

The present application claims priority to Korean Patent Application No. 10-2019-0113283, filed on Sep. 16, 2019, the entire contents of which is incorporated herein for all purposes by this reference.

BACKGROUND OF THE PRESENT INVENTION

Field of the Invention

The present invention relates to a clutch for a vehicle, and more particularly to a structure of a clutch applicable to a transmission or the like.

Description of Related Art

A plurality of clutches is used for a transmission of a vehicle to allow or interrupt the transmission of power between rotation bodies, which rotate relative to each other.

It is desired for a clutch to have large torque transmission capacity while having as small a volume as possible. However, the volume of the clutch is typically increased in proportion to an increase in torque transmission capacity.

Furthermore, when it is desired to increase the torque transmission capacity of the clutch, it is necessary to increase a friction area for generating frictional force. In a structure in which a friction area is increased using a large number of parts, intervals between the parts, which form the friction area, need to be appropriately secured in a disengaged state, in which the transmission of power is interrupted, to prevent the occurrence of drag and consequently to improve the fuel efficiency of a vehicle.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a cone clutch for a vehicle, which realizes relatively large torque transmission capacity while having a simple and compact configuration and a relatively small volume, and minimizes the generation of frictional force in a friction surface in a disengaged state, in which the transmission of power is interrupted, reducing the occurrence of drag and consequently improving the fuel efficiency of a vehicle.

In accordance with various aspects of the present invention, the above and other objects may be accomplished by the provision of a cone clutch for a vehicle including a hub mounted on a rotation shaft such that the axial movement and rotation thereof are restrained, a sleeve mounted on the external side of the hub such that the rotation thereof is restrained and the axial movement thereof is allowed, a clutch ring mounted such that the axial movement thereof is restrained and the rotation thereof is allowed relative to the rotation shaft, the clutch ring being integrally provided with a clutch cone protruding toward the hub such that the external diameter thereof gradually decreases toward the hub, a first friction ring mounted between the clutch ring and the hub such that the rotation thereof is restrained relative to the hub, the first friction ring being configured to be pressed toward the clutch ring in an axial direction thereof to form frictional force with the clutch cone, an internal middle cone mounted such that the rotation thereof is restrained relative to the clutch ring, the internal middle cone having an internal side surface formed to be brought into contact with the external side surface of the first friction ring, a second friction ring mounted such that the rotation thereof is restrained relative to the hub, the second friction ring having an internal side surface formed to be brought into contact with the external side surface of the internal middle cone, an external middle cone mounted such that the rotation thereof is restrained relative to the clutch ring, the external middle cone having an internal side surface formed to be brought into contact with the external side surface of the second friction ring, and a third friction ring mounted such that the rotation thereof is restrained relative to the hub, the third friction ring having an internal side surface formed to be brought into contact with the external side surface of the external middle cone when pressed by the sleeve. When the third friction ring is pressed by the sleeve and the third friction ring, the external middle cone, the second friction ring, the internal middle cone, the first friction ring, and the clutch cone are sequentially brought into close contact with each other, the distances from the hub in an axial direction may gradually increase in the order of the first friction ring, the internal middle cone, the second friction ring, the external middle cone, and the third friction ring.

The distances from the hub to the first friction ring, the internal middle cone, the second friction ring, the external middle cone, and the third friction ring in the axial direction may gradually increase in that order to be multiples of the distance from the hub to the first friction ring.

The surface of the hub that faces the first friction ring, the internal middle cone, the second friction ring, the external middle cone, and the third friction ring may form a plane perpendicular to the rotation shaft.

The hub may have a hub passage formed therein to allow oil received through the interior of the rotation shaft to pass therethrough in a radial direction of the hub. The clutch ring may have a clutch ring passage formed therein to allow oil supplied through the hub passage to pass therethrough in a radial direction of the clutch ring. The first friction ring may be mounted such that one side thereof is located closer to the hub than the center portion of the clutch ring passage. The internal middle cone may be provided at one side thereof with a first inclined surface formed to be pressed toward the hub by oil moving through the clutch ring passage in a radial direction of the rotation shaft. The second friction ring may be provided at one side thereof with a second inclined surface formed to be pressed toward the hub by oil that has passed through the first inclined surface. The external middle cone may be provided at one side thereof with a third inclined surface formed to be pressed toward the hub by oil that has passed through the second inclined surface.

The angle formed between the second inclined surface and the rotation shaft may be smaller than the angle formed between the first inclined surface and the rotation shaft, and the angle formed between the third inclined surface and the rotation shaft may be smaller than the angle formed between the second inclined surface and the rotation shaft.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
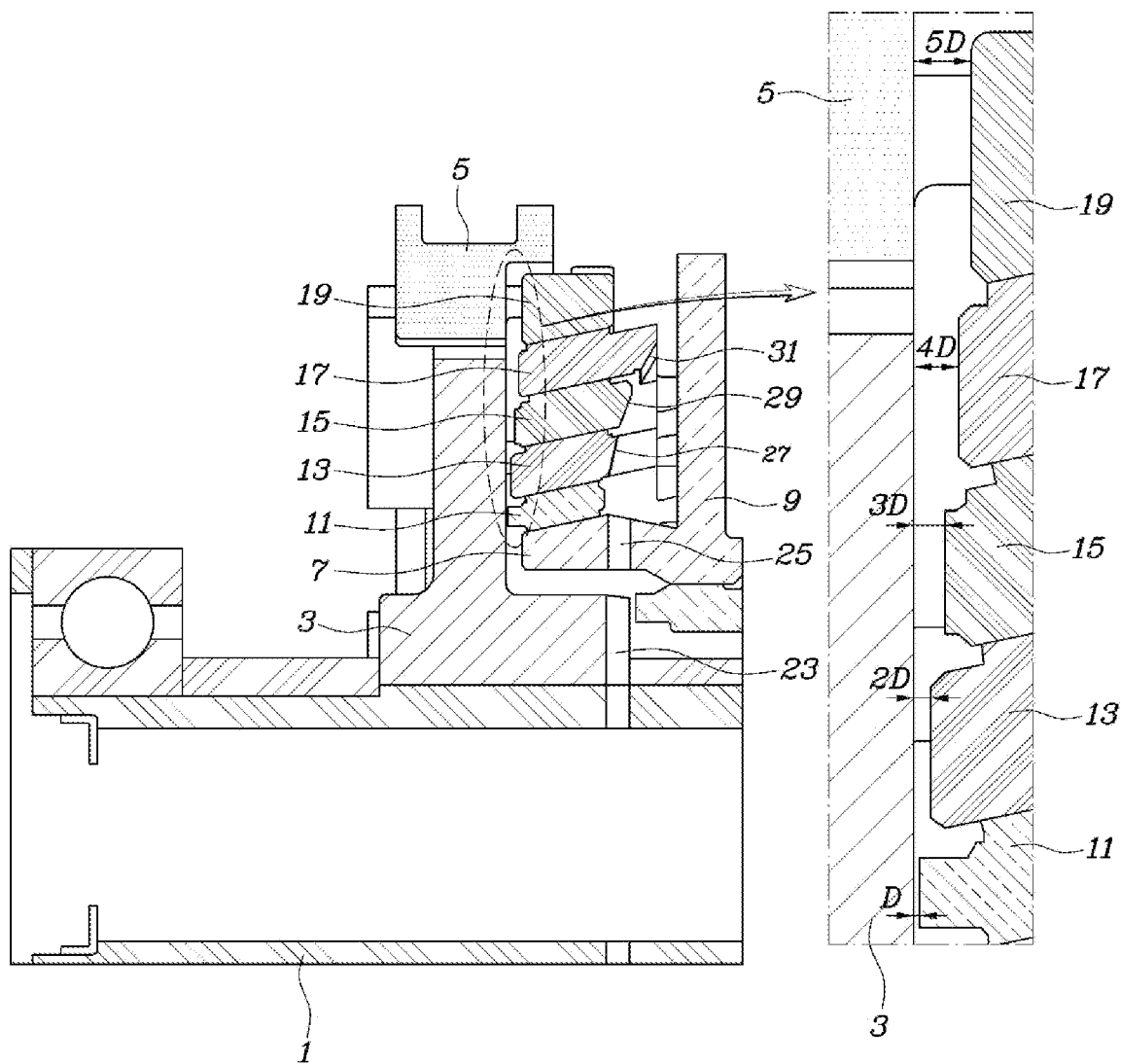
FIG. 1 is a cross-sectional view taken in a rotation-axial direction of a cone clutch for a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Reference will now be made in detail to the exemplary embodiments of the present invention, examples of which are illustrated in the accompanying drawings. Wherever possible, the same reference numbers will be used throughout the drawings to refer to the same or like parts.

Referring to FIG. 1, FIG. 2, FIG. 3, FIG. 4, and FIG. 5, a cone clutch for a vehicle according to an exemplary embodiment of the present invention includes a hub 3 mounted on a rotation shaft 1 such that the axial movement and rotation thereof are restrained, a sleeve 5 mounted on the external side of the hub 3 such that the rotation thereof is restrained and the axial movement thereof is allowed, a clutch ring 9 mounted such that the axial movement thereof is restrained and the rotation thereof is allowed relative to the rotation shaft 1, the clutch ring 9 being integrally provided with a clutch cone 7 protruding toward the hub 3 such that the external diameter thereof gradually decreases toward the hub 3, a first friction ring 11 mounted between the clutch ring 9 and the hub 3 such that the rotation thereof is restrained relative to the hub 3, the first friction ring 11 being configured to be pressed toward the clutch ring 9 in an axial direction thereof to form frictional force with the clutch cone 7, an internal middle cone 13 mounted such that the rotation thereof is restrained relative to the clutch ring 9, the internal middle cone 13 having an internal side surface formed to be brought into contact with the external side surface of the first friction ring 11, a second friction ring 15 mounted such that the rotation thereof is restrained relative to the hub 3, the second friction ring 15 having an internal side surface formed to be brought into contact with the external side surface of the internal middle cone 13, an external middle cone 17 mounted such that the rotation thereof is restrained relative to the clutch ring 9, the external middle cone 17 having an internal side surface formed to be brought into contact with the external side surface of the second friction ring 15, and a third friction ring 19 mounted such that the rotation thereof is restrained relative to the hub 3, the third friction ring 19 having an internal side surface formed to be brought into contact with the external side surface of the external middle cone 17 when pressed by the sleeve 5.

That is, the cone clutch according to an exemplary embodiment of the present invention is configured to switch between an engaged state, in which torque is transmitted between the hub 3 and the clutch ring 9, and a disengaged state, in which the transmission of torque therebetween is interrupted, in the state in which the hub 3 is mounted on the rotation shaft 1 such that the axial movement and rotation thereof are restrained and in which the clutch ring 9 is mounted such that the axial movement thereof is restrained and the rotation thereof is allowed. Furthermore, a gear is integrally coupled to the clutch ring 9, and thus the cone clutch of the present invention ultimately allows or interrupts the transmission of power between the rotation shaft 1 and the gear.

Figure 2:
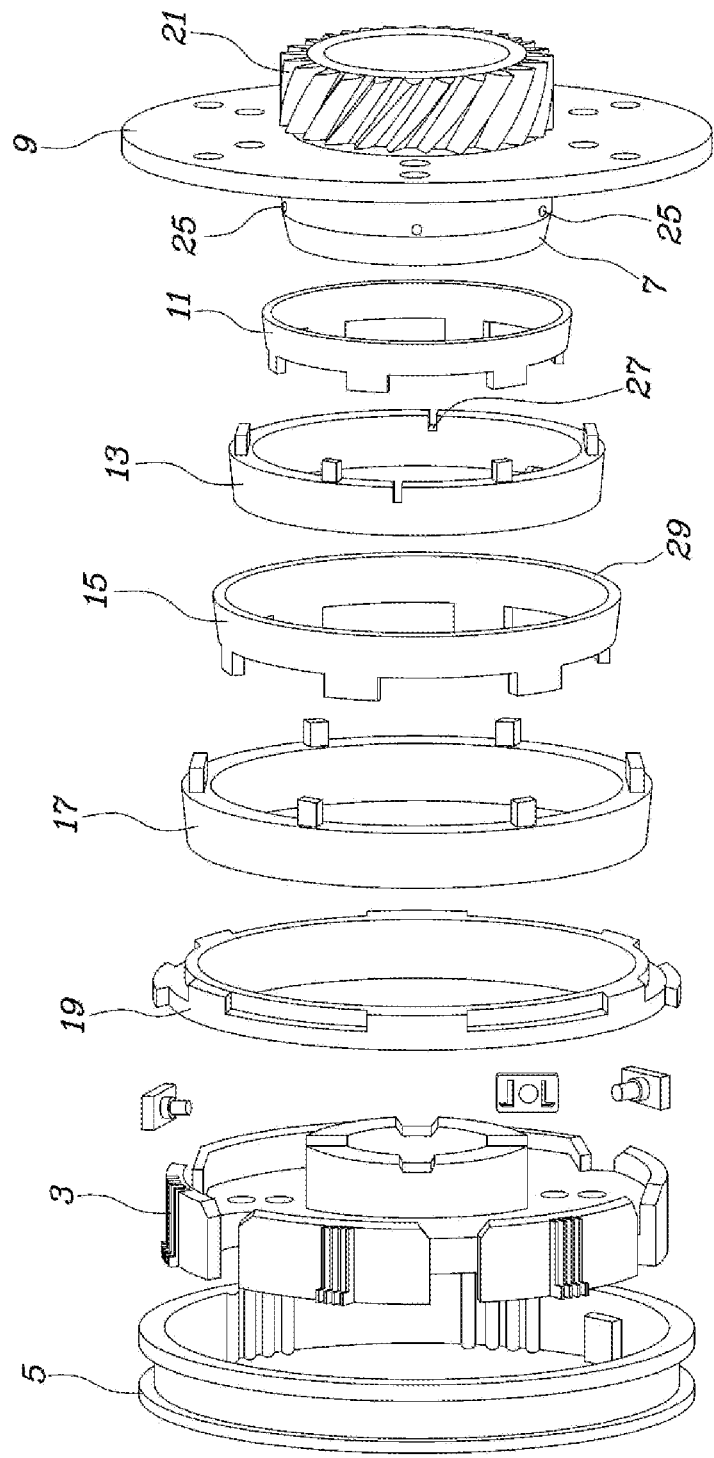
FIG. 2 is an exploded perspective view of the clutch shown in FIG. 1.
Figure 3:
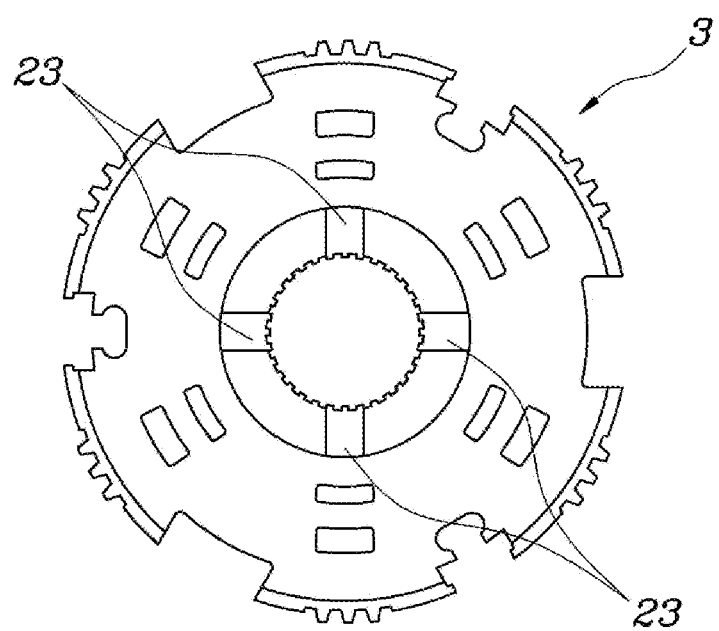
FIG. 3 is a view showing a hub shown in FIG. 2.

Referring to FIG. 2, a gear 21 is integrally coupled to the clutch ring 9.

The cone clutch of the present invention is configured for continuously changing the torque which is transmitted by continuously varying the frictional force between the hub 3 and the clutch ring 9, rather than transmitting torque using gears engaged with each other like a conventional synchromesh mechanism.

As used herein, the term "axial direction" is the longitudinal direction of the rotation shaft 1, and the term "radial direction" is the radial direction of the rotation shaft 1. In the engaged state shown in FIG. 4, the first friction ring 11, the second friction ring 15, and the third friction ring 19, which rotate along with the hub 3, are brought into close contact with the internal middle cone 13 and the external middle cone 17, which rotate along with the clutch ring 9, to form frictional force, allowing the transmission of power between the hub 3 and the clutch ring 9. In the disengaged state shown in FIG. 5, the first friction ring 11, the second friction ring 15, and the third friction ring 19 may rotate along with the hub 3, and the internal middle cone 13 and the external middle cone 17 may rotate along with the clutch ring 9 at a different speed from the hub 3.

Figure 4:
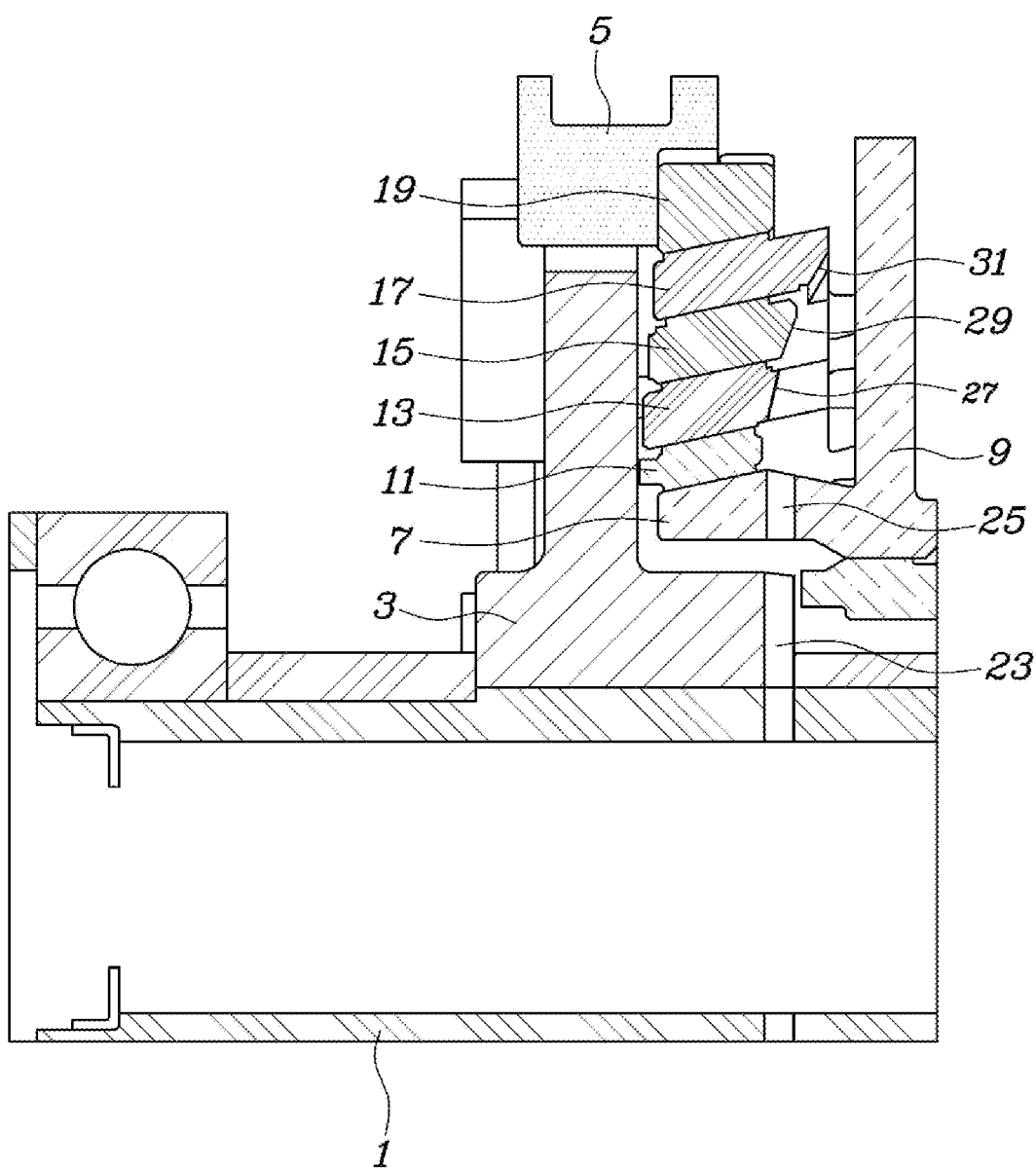
FIG. 4 is a view showing the engaged state of the clutch shown in FIG. 1, in which the transmission of torque is allowed.

As shown in FIG. 4, the third friction ring 19 is pressed by the sleeve 5, so that the third friction ring 19, the external middle cone 17, the second friction ring 15, the internal middle cone 13, the first friction ring 11, and the clutch cone 7 are sequentially brought into close contact with each other. The in the instant state, as shown in FIG. 1, the distances from the hub 3 in the axial direction gradually increase in the order of the first friction ring 11, the internal middle cone 13, the second friction ring 15, the external middle cone 17, and the third friction ring 19.

FIG. 4 shows the engaged state in which the sleeve 5 presses the third friction ring 19 so that torque is transmitted between the hub 3 and the clutch ring 9. FIG. 1 shows the state in which only the sleeve 5 is retreated to a neutral position from the state shown in FIG. 4 to compare the distance from the hub 3 to the third friction ring 19 in the axial direction with the distances from the hub 3 to the other components in the axial direction thereof.

That is, when the third friction ring 19 is pressed by the sleeve 5 and thus the third friction ring 19, the external middle cone 17, the second friction ring 15, the internal middle cone 13, the first friction ring 11, and the clutch cone 7 are sequentially brought into close contact with each other and are moved toward the clutch ring 9 to the maximum extent, the distances from the hub 3 gradually increase in the order of the first friction ring 11, the internal middle cone 13, the second friction ring 15, the external middle cone 17, and the third friction ring 19.

Figure 5:
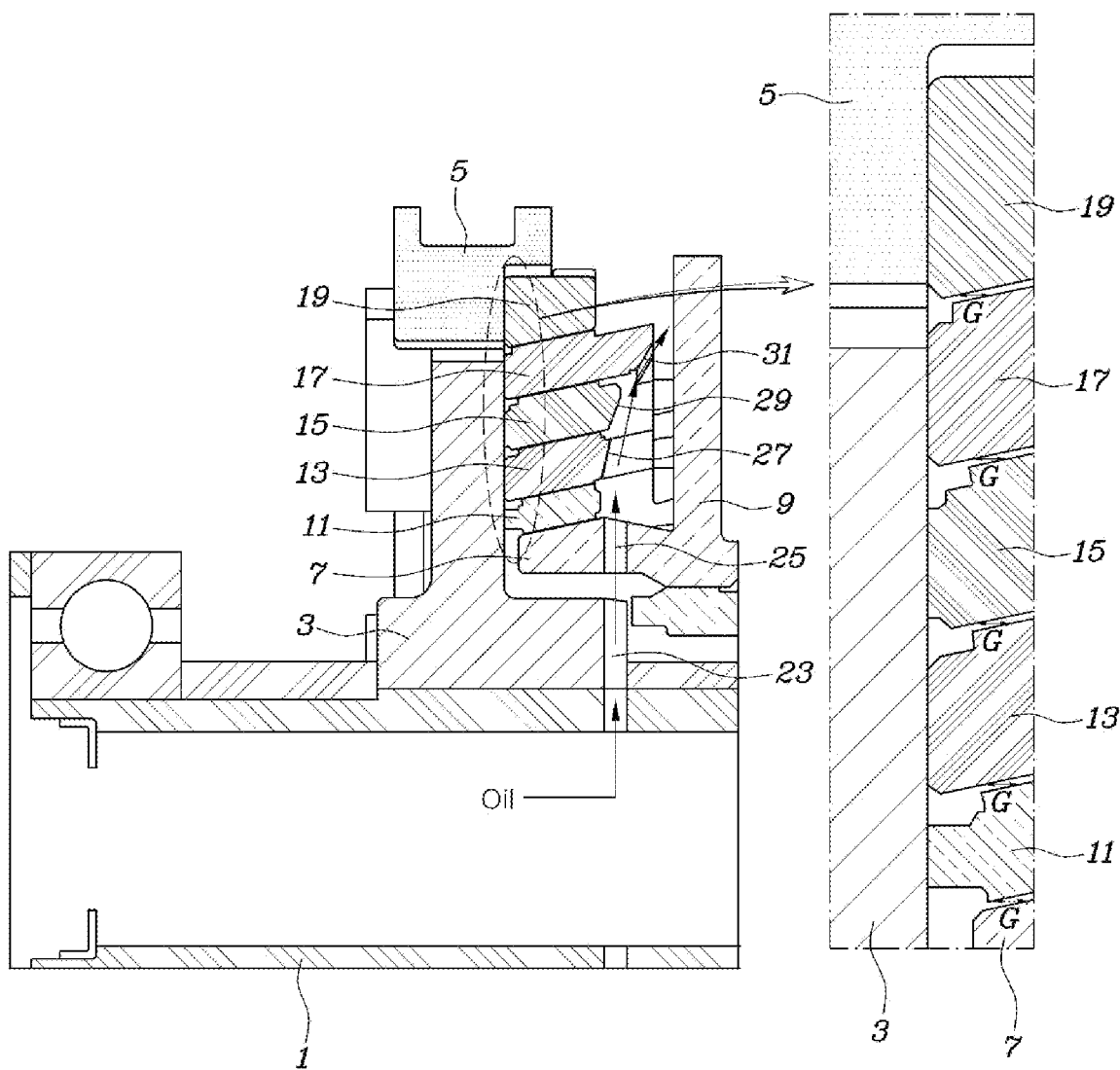
FIG. 5 is a view showing the disengaged state of the clutch shown in FIG. 1, in which the transmission of torque is interrupted.

Accordingly, since the distances from the hub 3 to the above components (the first friction ring 11, the internal middle cone 13, the second friction ring 15, the external middle cone 17, and the third friction ring 19) gradually increase in the radial direction of the rotation shaft 1 in the state in which the above components are in close contact with each other and are moved toward the clutch ring 9 to the maximum extent, when the above components are brought into close contact with the hub 3, as shown in FIG. 5, gaps G are naturally formed between the above components due to the structural characteristics thereof.

If gaps G are formed between the components as described above, almost no frictional force may be generated between the components, and thus the occurrence of drag may be greatly reduced.

The state shown in FIG. 5 is the disengaged state of the cone clutch of the present invention, in which the transmission of power is interrupted. In the instant state, almost no drag occurs between the components, minimizing the amount of power unnecessarily consumed during travel of a vehicle and consequently improving the fuel efficiency of the vehicle.

In the engaged state shown in FIG. 4, the first friction ring 11, the second friction ring 15, and the third friction ring 19, which rotate along with the hub 3, are brought into close contact with the internal middle cone 13 and the external middle cone 17, which rotate along with the clutch ring 9, to form frictional force, allowing the transmission of power between the hub 3 and the clutch ring 9. In the disengaged state shown in FIG. 5, the first friction ring 11, the second friction ring 15, and the third friction ring 19 may rotate along with the hub 3, and the internal middle cone 13 and the external middle cone 17 may rotate along with the clutch ring 9 at a different speed from the hub 3.

In the exemplary embodiment of the present invention, the distances from the hub 3 to the first friction ring 11, the internal middle cone 13, the second friction ring 15, the external middle cone 17, and the third friction ring 19 in the axial direction gradually increase in that order to be multiples of the distance D from the hub 3 to the first friction ring 11.

Therefore, as shown in FIG. 5, in the state in which the above components are in close contact with the hub 3, uniform gaps are formed between the above components, preventing gaps G between specific components from being formed to be smaller or larger and consequently preventing the increase in drag in a local area.

In the exemplary embodiment of the present invention, the surface of the hub 3 that faces the first friction ring 11, the internal middle cone 13, the second friction ring 15, the external middle cone 17, and the third friction ring 19 forms a plane perpendicular to the rotation shaft 1.

Furthermore, the hub 3 has a hub passage 23 formed therein, through which oil received through the interior of the rotation shaft 1 passes in the radial direction of the hub 3. The clutch ring 9 has a clutch ring passage 25 formed therein, through which oil supplied through the hub passage 23 passes in the radial direction of the clutch ring 9. The first friction ring 11 is mounted such that one side thereof is located closer to the hub 3 than the center portion of the clutch ring passage 25. The internal middle cone 13 is provided at one side thereof with a first inclined surface 27, which is pressed toward the hub 3 by the oil moving through the clutch ring passage 25 in the radial direction of the rotation shaft 1. The second friction ring 15 is provided at one side thereof with a second inclined surface 29, which is pressed toward the hub 3 by the oil that has passed through the first inclined surface 27. The external middle cone 17 is provided at one side thereof with a third inclined surface 31, which is pressed toward the hub 3 by the oil that has passed through the second inclined surface 29.

Thus, the above components receive force by which the above components are moved toward the hub 3 due to the flow of the oil that moves in the radial direction of the rotation shaft 1 through the hub passage 23 and the clutch ring passage 25.

That is, in the state in which the sleeve 5 does not press the third friction ring 19 toward the clutch ring 9, the above components are basically pressed toward the hub 3 by the flow of oil.

Thus, in the state in which the sleeve 5 is in the neutral state, as shown in FIG. 1, the above components are naturally pressed toward the hub 3 by the flow of oil, forming the disengaged state shown in FIG. 5, in which the occurrence of drag is minimized.

Since the one side of the first friction ring 11 is located closer to the hub 3 than the center portion of the clutch ring passage 25, the first friction ring 11 is pressed by the oil discharged in the radial direction via the hub passage 23 and the clutch ring passage 25. As a result, the first friction ring 11 is pressed toward the hub 3.

The angle formed between the second inclined surface 29 of the second friction ring 15 and the rotation shaft 1 is smaller than the angle formed between the first inclined surface 27 of the internal middle cone 13 and the rotation shaft 1. The angle formed between the third inclined surface 31 of the external middle cone 17 and the rotation shaft 1 is smaller than the angle formed between the second inclined surface 29 of the second friction ring 15 and the rotation shaft 1. As a result, the oil discharged in the radial direction via the hub passage 23 and the clutch ring passage 25 sequentially applies pressure to the first inclined surface 27, the second inclined surface 29, and the third inclined surface 31.

As described above, due to the structural characteristics that the first friction ring 11, the internal middle cone 13, the second friction ring 15, the external middle cone 17, and the third friction ring 19 exhibit together with the hub 3 and the clutch ring 9, in the engaged state, in which power is transmitted between the hub 3 and the clutch ring 9, a relatively large friction area is formed within a relatively small volume, providing increased torque transmission capacity, and in the disengaged state, in which the transmission of power is interrupted, gaps G are naturally secured between the components used to form the friction surface, minimizing the occurrence of drag and consequently improving the fuel efficiency of a vehicle.

As is apparent from the above description, various aspects of the present invention are directed to providing a cone clutch for a vehicle, which realizes relatively large torque transmission capacity while having a simple and compact configuration and a relatively small volume, and minimizes the generation of frictional force in a friction surface in a disengaged state, in which the transmission of power is interrupted, reducing the occurrence of drag and consequently improving the fuel efficiency of a vehicle.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A cone clutch for a vehicle, the cone clutch apparatus comprising:
    a hub mounted on a rotation shaft such that an axial movement and a rotation of the hub are restrained;
    a sleeve mounted on an external side of the hub such that a rotation of the sleeve is restrained and an axial movement of the sleeve is allowed;
    a clutch ring mounted such that an axial movement of the clutch ring is restrained and a rotation of the clutch ring is allowed relative to the rotation shaft, the clutch ring being integrally mounted with a clutch cone protruding toward the hub such that an external diameter of the clutch cone is formed to decrease toward the hub;
    a first friction ring mounted between the clutch ring and the hub such that a rotation of the first friction ring is restrained relative to the hub, the first friction ring being configured to be pressed toward the clutch ring in an axial direction of the first friction ring to apply frictional force with the clutch cone;
    an internal middle cone mounted such that a rotation of the internal middle cone is restrained relative to the clutch ring, the internal middle cone including an internal side surface formed to be brought into contact with an external side surface of the first friction ring;
    a second friction ring mounted such that a rotation of the second friction ring is restrained relative to the hub, the second friction ring including an internal side surface formed to be brought into contact with an external side surface of the internal middle cone;
    an external middle cone mounted such that a rotation of the external middle cone is restrained relative to the clutch ring, the external middle cone including an internal side surface formed to be brought into contact with an external side surface of the second friction ring; and
    a third friction ring mounted such that a rotation of the third friction ring is restrained relative to the hub, the third friction ring including an internal side surface formed to be brought into contact with an external side surface of the external middle cone when pressed by the sleeve,
    wherein, when the third friction ring is pressed by the sleeve and the third friction ring, the external middle cone, the second friction ring, the internal middle cone, the first friction ring, and the clutch cone are sequentially brought into contact with each other, distances from the hub in an axial direction of the clutch cone increase in an order of the first friction ring, the internal middle cone, the second friction ring, the external middle cone, and the third friction ring.

2. The cone clutch apparatus according to claim 1, wherein distances from the hub to the first friction ring, the internal middle cone, the second friction ring, the external middle cone, and the third friction ring in the axial direction increase in an order to be multiples of a distance from the hub to the first friction ring.

3. The cone clutch apparatus according to claim 1, wherein a surface of the hub that faces the first friction ring, the internal middle cone, the second friction ring, the external middle cone, and the third friction ring forms a plane perpendicular to the rotation shaft.

4. The cone clutch apparatus according to claim 1, wherein the hub includes a hub passage formed in the hub to allow oil received through an interior of the rotation shaft to pass therethrough in a radial direction of the hub,
    wherein the clutch ring includes a clutch ring passage formed therein to allow oil supplied through the hub passage to pass therethrough in a radial direction of the clutch ring,
    wherein the first friction ring is mounted such that one side of the first friction ring is located closer to the hub than a center portion of the clutch ring passage,
    wherein the internal middle cone is mounted at one side of the internal middle cone with a first inclined surface formed to be pressed toward the hub by oil moving through the clutch ring passage in a radial direction of the rotation shaft,
    wherein the second friction ring is mounted at one side of the second friction ring with a second inclined surface formed to be pressed toward the hub by oil that has passed through the first inclined surface, and
    wherein the external middle cone is mounted at one side of the external middle cone with a third inclined surface formed to be pressed toward the hub by oil that has passed through the second inclined surface.

5. The cone clutch apparatus according to claim 4, wherein an angle formed between the second inclined surface and the rotation shaft is smaller than an angle formed between the first inclined surface and the rotation shaft, and
    wherein an angle formed between the third inclined surface and the rotation shaft is smaller than the angle formed between the second inclined surface and the rotation shaft.

* * * * *